July 15, 1941.  K. MÜLLERHEIM  2,249,029
MOTOR DRIVING DEVICE FOR SELECTORS IN COMMUNICATION SYSTEMS
Filed May 29, 1936   2 Sheets-Sheet 1
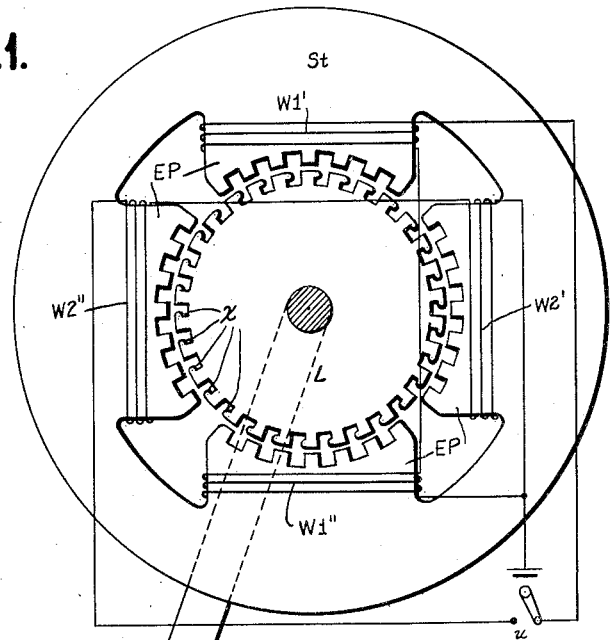
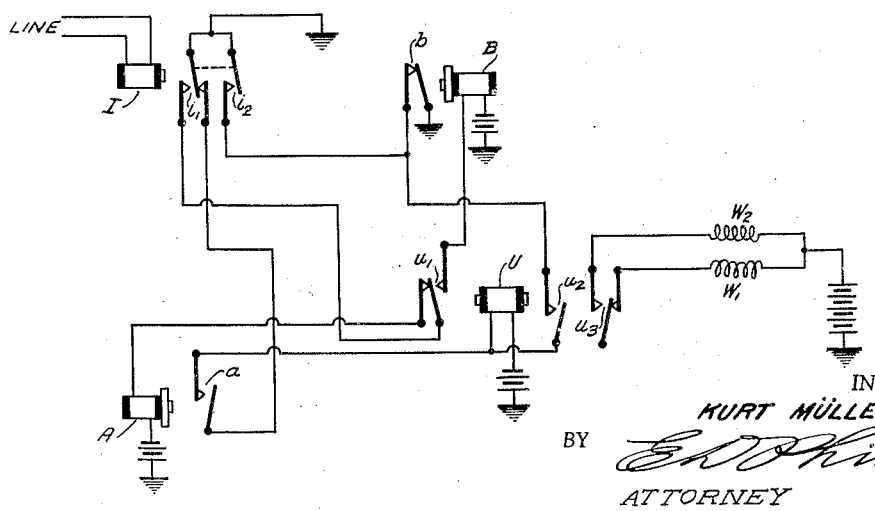
INVENTOR.
KURT MÜLLERHEIM
BY
ATTORNEY July 15, 1941.   K. MÜLLERHEIM   2,249,029
MOTOR DRIVING DEVICE FOR SELECTORS IN COMMUNICATION SYSTEMS
Filed May 29, 1936   2 Sheets-Sheet 2

INVENTOR.
KURT MÜLLERHEIM
BY
ATTORNEY

Patented July 15, 1941

2,249,029

UNITED STATES PATENT OFFICE 2,249,029

MOTOR DRIVING DEVICE FOR SELECTORS IN COMMUNICATION SYSTEMS

Kurt Müllerheim, Berlin-Charlottenburg, Germany, assignor to Mix & Genest Aktiengesellschaft, Berlin-Schoneberg, Germany Application May 29, 1936, Serial No. 82,516
In Germany June 13, 1935

1 Claim. (Cl. 177—353)

This invention relates to a motor drive device for selectors in remote communication installations. As is known, the drive of selectors by motors has the advantage over the drive by step switch gearing in that the drive is practically noiseless. However, the hitherto known motor drive devices for selectors display a series of disadvantages. In the hitherto known arrangements it was necessary to have a reducing gear between the motor drive device and the selector in order to bring down the relatively high number of revolutions of the motor to the lower number of revolutions of the selector. The high number of revolutions of the motor drive devices was based on the fact that there were generally only two exciter poles arranged at an angle of 90 or 180° and these were switched in alternately under the influence of the current impulse relay. Accordingly, on each falling back or pulling up of the current impulse relay, the known drive devices executed a quarter or even half a rotation, while the selector itself should only be moved one step forward on each pull-up or release of the current impulse relay. Neither can this disadvantage be evaded by providing a greater number of exciter poles on the circumference, because the winding of each exciter pole requires a certain amount of space which cannot be reduced. The mechanical reducing gears that were used with the known types of selectors for the purpose of producing the requisite relation as to number of revolutions increased the cost of the drive device, took up additional space and diminished the certainty of operation. Moreover, when using a gearing between the driving motor and the selector, it is usually necessary to have a correcting device (contact device), for example, controlled from the selector shaft, if only in consideration of the lost motion of the gearing.

A further disadvantage of the hitherto known arrangements consists in the fact that the air space between the motor armature and the exciter poles necessarily turns out to be relatively big because the armature, on one single alternation of poles, must be pulled over a full 90 or 180°. In order to produce the requisite power, the magnetic fields must be made correspondingly strong so that this causes a relatively high consumption of current.

In accordance with the invention, these disadvantages are avoided by the motor having several exciter poles or exciter pole groups which are differently displaced with respect to the motor by fractions of the pole pitch and which are energized in periodic sequence under the influence of the forward switching current impulses, and which are toothed in such a way that they have the same pole pitch as the rotor that is without winding. In this way the motor can without difficulty be given such a pole pitch that the angle between successive contact lamellae of the selector is equal to the pole pitch or a whole multiple of the pole pitch, so that the motor can accordingly drive the selector axle without any kind of mechanical reducing gearing.

The exact nature of the invention may best be understood from the drawings, in which Fig. 1 represents a selector switch in accordance with the invention;

Fig. 2 represents an impulse dividing circuit for use with a selector switch in accordance with the invention;

Fig. 3 represents an impulse multiplying circuit for use with a selector switch in accordance with the invention;

Figure 4:
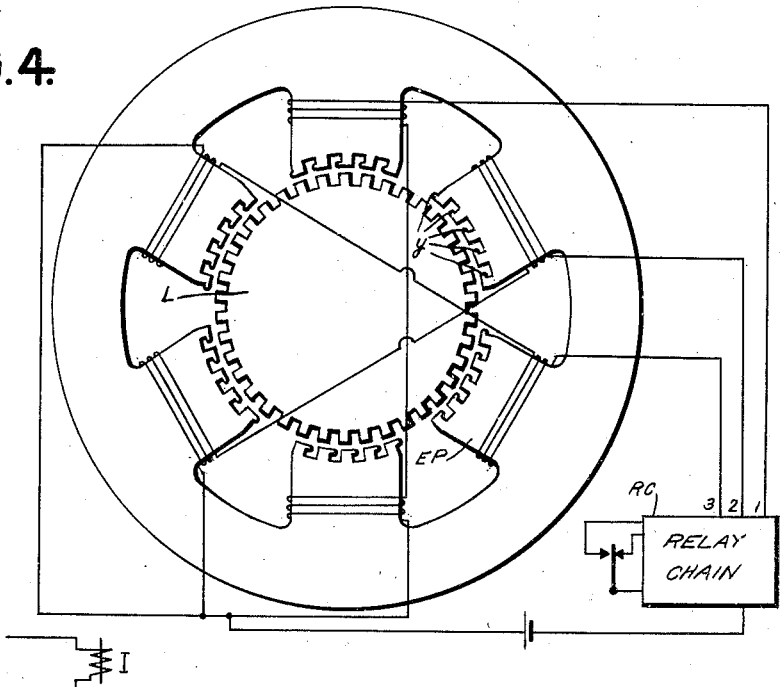
Fig. 4 represents another form of selector switch in accordance with the invention.

One form of construction of the invention is explained hereunder and illustrated in Fig. 1. This figure shows a motor with four exciter poles EP and a rotor L without winding. Both the exciter poles and the rotor are toothed and namely in such a way that the exciter poles have the same pole pitch (division of teeth) as the rotor. The number of teeth of the rotor is divisible by 2 but not by 4. In the form of construction shown in the drawings, the rotor has 30 teeth, for example. The exciter poles are all formed alike and the angular displacement between successive poles is exactly 90°. The teeth of the rotor are unsymmetrical in form, i. e. each of them has on one of its front edges a side extension or auxiliary pole $x$. The purpose of this auxiliary pole is to determine the direction of rotation of the motor.

Each of the four exciter poles has a winding, and the windings of the exciter poles that are each time located opposite each other, namely, the windings W1' and W1" and the windings W2' and W2" are connected in series, while the windings of the one or other pair of exciter poles can be made current carrying alternately by the alternating contact $u$. In the position of the alternating contact u as shown in the drawings, the windings W1' and W1'' are current carrying, so that the rotor L is permeated by a magnetic flux running from top to bottom. Consequently the rotor finds itself in the position shown in the drawings in which the teeth of the rotor are located exactly opposite the teeth of the top and bottom exciter poles, because then the lines of force passing over the air space have their shortest length. If the contact u is now shifted from right to left, then this leaves the windings W1' and W1'' without current and instead the windings W2' and W2'' under current. This results in the rotor being turned round by half a tooth division, that is by the width of a tooth, and such rotation takes place in clockwise direction because, as a result of the auxiliary poles of the rotor, the forces of magnetic attraction acting in this direction overcome the forces acting in the opposite direction. The rotor thus reaches a position in which its teeth are located exactly opposite the teeth of the right and left exciter poles. If the contact u is now shifted back to the right, then the rotor L again moves half a tooth division clockwise, and so on.

From the above it can be seen that the motor moves forward one tooth division on each complete to and fro movement of the alternating contact u. If therefore the contact u is the contact of the current impulse receiving relay itself of the selector, then on each complete pull-up and fall-back of this relay the motor axle advances by one tooth division. It results from this that no kind of increasing or reducing gears are at all necessary if the contact lamellae of the selector have the same angular pitch as the rotor of the motor, i. e. if in the embodiment of Fig. 1 there are 30 lamellae in all over the entire circumference. If the selector is to receive double the number of contact lamellae, that is 60 contact lamellae in all, then care can be taken of this by having the contact u controlled with half the velocity, i. e. on each complete pull-up and release of the current impulse relay only one single shifting is made from the one pair of exciter poles to the other. A switching arrangement that effects this is shown in Fig. 2 and will be explained further on. On the other hand, it is however also possible to drive by means of the motor shown in Fig. 1 a selector that has a fewer number of lamellae than 30, thus for example only 15 contact lamellae in all. In this case use can be made of a current impulse multiplication device, one form of construction of which is shown as an example in Fig. 3. By means of such a current impulse multiplying device is can accordingly be effected that the contact u executes several alternations on each current impulse of the current impulse receiving relay and that the rotor of the motor is correspondingly advanced by several tooth divisions. It can thus be seen that instead of a mechanical increasing or reducing gearing such current impulse multiplying or dividing devices can be used that do not display the above described disadvantages of mechanical gearing. Of course a combination of mechanical and electrical increasing or reducing devices is also possible.

Figure 5:
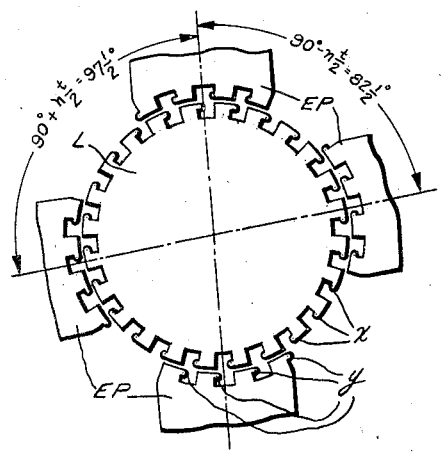
Fig. 5 represents so much of a selector switch as is necessary for understanding the various forms of selector switch in accordance with the invention.

As already mentioned above, the four exciter poles in the form of construction shown in Fig. 1 are of like form and are arranged with a 90° displacement between successive poles. This is attained by selecting the number of teeth of the rotor to be divisible by 2 but not by 4. If, in consideration of the number of contact lamellae of the selector, other numbers of teeth are desired, then account can be taken of this, as for example by employing a corresponding angular displacement between the pairs of exciter poles. If, for example, the number of teeth is divisible by 4, then the two pairs of exciter poles would have to be displaced with respect to each other by $$90° \pm n \cdot \frac{t}{2}$$

in which $t$ is the angular pole pitch in degrees and $n$ is an odd integral number. Fig. 5 shows such an arangement with a 36 tooth rotor and with the value 1 taken for $n$. The motor structure of Fig. 5 is otherwise similar to that of Fig. 1.

One is however also not restricted to the number of exciter poles (two pairs of exciter poles) that is shown in the mode of construction given as an example but another number of pairs of exciter poles or generally of exciter pole groups can be selected, e. g. the motor can be given three pairs of exciter poles, so that a six pole arrangement results as shown in Fig. 4. The requisite number of teeth of the rotor for a symmetrical arrangement of exciter poles, or the requisite mutual displacement of the pairs of exciter poles respectively, is of course different in this case. Also the shifting from the first to the second and from the second to the third group of exciter poles, and so on, must then be effected in another manner, e. g. by means of a relay chain RC that is controlled by the current impulse receiving relay I.

Figure 6:
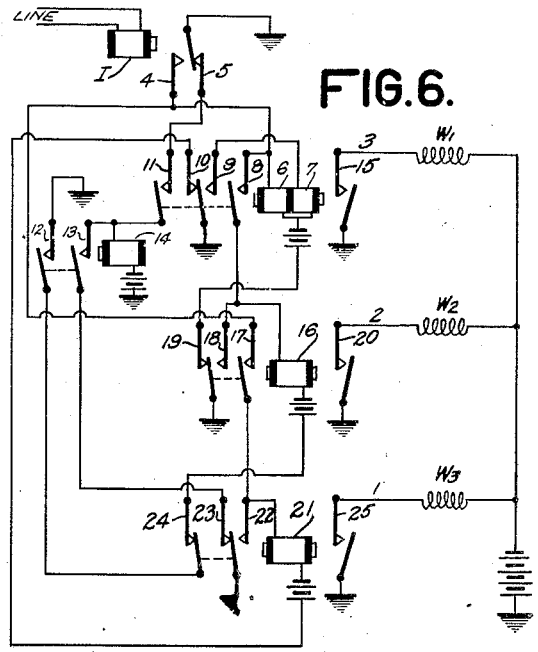
Fig. 6 shows the details of a relay chain suitable for operation with the selective switch as shown in Fig. 4.

An example of the relay chain RC of Fig. 4 is shown in Fig. 6. An impulse arriving over the line operates relay I and closes contact 4, thereby energizing relay winding 6 by ground, contact 4, winding 6, battery, contact 19, and ground. Winding W1 is then energized over contact 15 and the associated winding battery. This first relay locks itself by ground, contact 9, winding 7, battery, contact 19, and ground, and the line from contact 4 is transferred to relay 16 by contact 8. Relay 16 does not operate because its battery circuit is open at contact 12 associated with relay 14. Although the first relay has operated closing contact 11, relay 14 cannot close its contact until relay I is de-energized and contact 5 is closed.

When relay I becomes de-energized and contact 5 closes, winding 14 is energized by ground, contact 5, contact 11, winding 14, battery, and ground. Relay 16 is then conditioned for the next impulse arising over the line. Relay 14 locks itself by ground, contact 23, contact 15, winding 14, battery, and ground.

The next operation of relay I energizes winding 16 by ground, contact 4, contact 8, winding 16, battery, contact 24, contact 12, and ground. The operation of relay 16 closes contact 20 and energizes winding W2 over its associated battery and ground. At the same time, winding W1 is de-energized due to the release of the first relay. The release of the first relay comes about by the opening of contact 19 which opens the battery circuit of winding 7. If the first relay is a slow release relay, relay 21 cannot operate because during the duration of the line impulse the first relay is opening and contact 10 has not closed. To further avoid any difficulties contact 10 may be used to operate an additional relay which in turn closes the battery circuit of relay 21.

Relay 16 locks itself by ground, contact 18, winding 16, battery, contact 24, contact 12, and ground. The line from contact 4 is now transferred to relay 21 by contact 17. When relay I again operates due to an impulse from the line contact 4 closes and energizes relay 21 by ground, contact 4, contact 17, winding 21, battery, contact 10, and ground. Contact 25 closes and energizes winding W3 over its associated battery and ground, and simultaneously winding W2 is de-energized due to the release of contact 16. Relay 16 and relay 14 are released by the contacts 24 and 23, respectively. Relay 21 locks itself by ground, contact 22, winding 21, battery, contact 10, and ground. The first relay cannot operate since contact 19 does not close until the release of relay 16 which does not occur until the operation of relay 21. If relay 16 is also a slow release relay, contact 19 will not close until the line impulse has been completed. When contact 19 does close the first relay is again conditioned to operate upon the receipt of an impulse over the line and the subsequent energization of relay I. Relay 21 is released when the first relay again operates due to the opening of contact 10. It is thus apparent that the windings of W1, W2 and W3 are successively energized by impulses received over the lines.

The number of exciter poles to each group of exciter poles—two in each of the examples shown—can also be selected as desired. One can also, for example, imagine an arrangement in which only one exciter pole of each group of exciter poles is toothed, while the other is without gaps and thus has only the function of completing the magnetic circuit over a constant air gap without taking part in the production of the moment of rotation itself. The yoke too can assume a different form.

As already mentioned, the asymmetrical formation of the teeth of the rotor is for the purpose of determining the direction of rotation of the motor. This is especially requisite with a motor that has only two groups of exciter poles. If it has three or more groups of exciter poles which are connected in cyclically as in Fig. 4, then the direction of rotation is already determined by the direction of this cycle, so that in this case the auxiliary poles are not in themselves requisite but would only have a supporting effect. Instead of the rotor teeth, the teeth of the stator can also be formed unsymmetrically or provided with auxiliary poles $y$ as shown in Fig. 4, or this means can be applied at the same time to stator and rotor as shown in Fig. 4.

Selectors with the motor drive device according to the invention can be used in the most various switching arrangements, and indeed both as hunting selectors (free selection) and also as line or group selectors (numerical selection or semi-numerical selection). In the first case the shift contact is controlled by a current impulse relay and in the second case by an interrupter device. The circuits for controlling selector switches are well known in the telephone art and allied arts and in themselves form no part of my invention.

In Fig. 2 there is shown as an example a switching arrangement which permits of only one single shifting from the one group of exciter poles to the other being effected on each joint pull-up and relapse of the current impulse relay. The windings of the two groups of exciter poles are indicated by W1 and W2, the current impulse relay (not shown) by I. U is the shifting relay which at its alternating contact $u3$ switches over from the one group of exciter poles to the other; A and B are auxiliary relays. The mode of operation of the switching arrangement is as follows: At the first excitation of the current impulse relay, relay A becomes energized:

Earth, $i1$, $u1$, A, battery

Relay A operates and at its contact $a$ prepares a circuit for relay U. This circuit is closed on release of the current impulse relay I, for relay A still remains pulled up for a moment whereas I has already fallen back:

Earth, $i1$, $a$, U, battery

Relay U, after the release of A, holds up over

Earth, $b$, $u2$, U, battery

At its contacts $u3$, relay U disconnects the windings W1 and switches in the windings W2, so that the selector moves forward by half a pole pitch and consequently, as assumed, by a full contact lamella. At $u1$ the circuit is prepared for relay B.

At the second current impulse, relay I again comes into operation and now switches in B:

Earth, $i1$, $u1$, B, battery

At the contact $b$ the holding circuit of U is preparatorily opened. Relay U however still holds up over $i2$ as long as the current impulse relay I is energized. When I now falls back again after termination of the current impulse, then relay U cannot hold up any longer, as relay B still remains shifted for a moment and the contact $b$ has thus not yet closed again. The relays A, B and U are now again at rest. At the contact $u3$, the windings W2 are again disconnected and the windings W1 switched in instead, so that the selector is once more moved forward by half a pole pitch and consequently by another complete contact lamella.

By means of the switching arrangement described, the selector can thus be made to execute one step on each pull-up and relapse of the current impulsey relay, i. e. on each current impulse, although the number of teeth of the motor's rotor is only half as much as the number of contact lamellae of the selector.

Fig. 3 shows a simple current impulse multiplying device such as can be used when the division of the contact lamellae of the selector is a multiple of the pole pitch, i. e. when the number of teeth of the rotor is a multiple of the number of lamellae of the selector over the entire circumference. The mode of operation of the switching arrangement shown in Fig. 3 is as follows: At the first current impulse the contact $i$ is shifted from right to left. As the condenser C is charged in the condition of rest, it now discharges over the winding I of the shifting relay U, so that relay U operates for a short while and shifts its contact $u$ temporarily to the left. Thereupon relay U at once falls back again and contact $u$ is thus switched back again to the right. If the current impulse has now terminated, then the contact $i$ again returns to the position of rest. The condenser C is now charged once more over the winding II of the shifting relay U. Under the current impulse of this charge the relay U once more comes into operation for a short while over its second winding and effects at $u$ a new temporary shifting. In this way it is thus obtained that on each current impulse (pull-up and relapse of the current impulse relay I) there are executed two complete alternations at the contact $u$, so that the motor is rotated four times by half a pole pitch. If there are two rotor teeth to each contact lamella, then in this case, on each current impulse picked up by the current impulse receiving relay, the selector is switched forward by one lamella step, which is what is usually desired. As is shown in Fig. 3 as an example, currents can be prevented in a simple manner from flowing in the condition of rest by making use of current impulses from the charging or discharging of condensers.

The securing of the selector in one position can be effected either by mechanical devices, which for example act after the manner of rests, or by maintaining a magnetic field which retains the motor's rotor in a definite position.

What I claim is:

A switching arrangement comprising a selective switching device which comprises a plurality of circumferentially disposed contact lamellae, a rotary selector having a selector axle and adapted to set over said lamellae, a toothed unwound rotor mechanically connected to directly drive said selector axle, a stator having a plurality of poles, each pole being sub-divided into a plurality of like poles all having a common field winding, said poles being variously displaced with respect to the teeth of said rotor by fractions of the rotor toothed pitch, and means for magnetizing said stator poles in periodic sequence in response to switch actuating current impulses, the angular tooth pitch of said toothed rotor being an exact sub-multiple of the angular contact pitch of said contact lamellae, and further comprising a current impulse multiplying device having means to shift the energization from one group of stator poles to another group of stator poles twice for each energization and twice for each de-energization of said impulse multiplying device, whereby alternate energization of said poles results in step-by-step movement of the rotor in the same direction, and a line over which control pulses are transmitted to said impulse multiplying device.

KURT MÜLLERHEIM.